UNITED STATES PATENT OFFICE.

HENRY SELIGMAN, OF IRVINGTON, NEW YORK.

IMPROVEMENT IN DEODORIZING, DISINFECTING, AND FERTILIZING COMPOUNDS.

Specification forming part of Letters Patent No. 191,476, dated May 29, 1877; application filed March 15, 1877.

*To all whom it may concern:*

Be it known that I, HENRY SELIGMAN, of Irvington, in the county of Westchester, in the State of New York, have invented a new and useful Deodorizing, Disinfecting, and Fertilizing Compound, of which the following is a specification:

This invention consists in a peculiar dry compound, which is primarily intended for deodorizing stables, the same serving to absorb ammonia and other nitrogenous matter, and thus to render the atmosphere free from the prevailing pungent odor, which is unpleasant to man and beast. The ammoniacal gases thus absorbed are also very injurious to the varnish and upholstering of carriages, &c., and to blankets and clothing kept in stables, all of which are, consequently, preserved, as well as purified, by the use of the compound. The same serves also to render the stable-manure, or any manure to which it may be applied, a greatly-improved fertilizer, by thus absorbing and retaining ammonia and other nitrogenous matter, which is an important fertilizing element.

The compound may be used as a deodorizer and disinfectant in water-closets, commodes, sewers, &c., with or without one or more of the common disinfecting materials—such as sulphate of iron.

The basis of this compound is a mineral salt derived from the Kali mines in Germany, containing a considerable percentage of potash.

Several varieties of the salt are obtained from different stratas in the respective Kali mines, situated at Stassfurt and Westeregeln, Germany, and are known by such names as carnallit, kainit, polyhalit, sylvin, tachhydrit, &c.

An analysis of a specimen of carnallit is as follows:

| | |
|---|---:|
| Chloride of potassium | 26.76 |
| Chloride of magnesium | 34.50 |
| Water | 38.74 |
| | 100.00 |

The above is given as an example, and carnallit is preferred, because it contains a large percentage of potassium, and exists in great quantities. In kainit and polyhalit the potassium is found as a sulphate. In sylvin and tachhydrit the potassium is again met with as a chloride. The percentage varies in different specimens.

This mineral salt, in a crushed or pulverized state, is mixed with crushed or pulverized gypsum, lime, or another calcareous substance, and an acid—such as sulphuric acid—is added to combine the other ingredients. Gypsum is preferred to other calcareous substances, because it unites more readily with the mineral potash-salt.

The proportions which I have found, by experiments, to answer all purposes, are as follows: Mineral potash-salt, seventy parts; gypsum or lime, twenty-five parts; sulphuric acid, five parts.

I do not limit myself to these proportions, because the mineral potash-salt varies in strength, and the relative proportion of any of the ingredients may be increased or diminished, to a limited extent, without materially affecting the result.

To render the compound more effective as a deodorizer and disinfectant for water-closets, urinals, and the like, I prefer to add thereto for this use a small percentage of sulphate of iron.

I also propose to use chloride of zinc, carbolic acid, and other of the common disinfecting materials, in connection with my mineral potash compound, in particular cases, where the additional strength and peculiar properties of such materials are desirable.

My mineral potash compound, as used in stables, operates to absorb and retain the ammonia, which otherwise escapes in the form of noxious and deleterious gases; and the manure with which the compound is mixed becomes enriched, not only by the ingredients of the compound, but also by the considerable quantity of ammonia thus absorbed and retained. This is liberated with the other fertilizing elements of the compound and manure, when the latter is used for agricultural purposes in the ordinary way.

The new compound is also very valuable for the same reasons, for use in forming composts, and it may be used alone or in connection with other manures as a top-dressing for land.

Prior to this my invention the said mineral potash-salt was used alone as a fertilizer. Such separate uses of either of the ingredients of my compound forms no part of the present invention.

The following is what I claim as new and desire to secure by Letters Patent of the United States:

The mineral potash disinfecting, deodorizing, and fertilizing compound herein specified, consisting of the described mineral salt, with a calcareous substance, such as gypsum, and an acid, such as sulphuric acid, in about the proportions set forth.

HENRY SELIGMAN.

Witnesses:
CHARLES F. BATES,
JAS. L. EWIN.